United States Patent Office 2,934,694
Patented Apr. 26, 1960

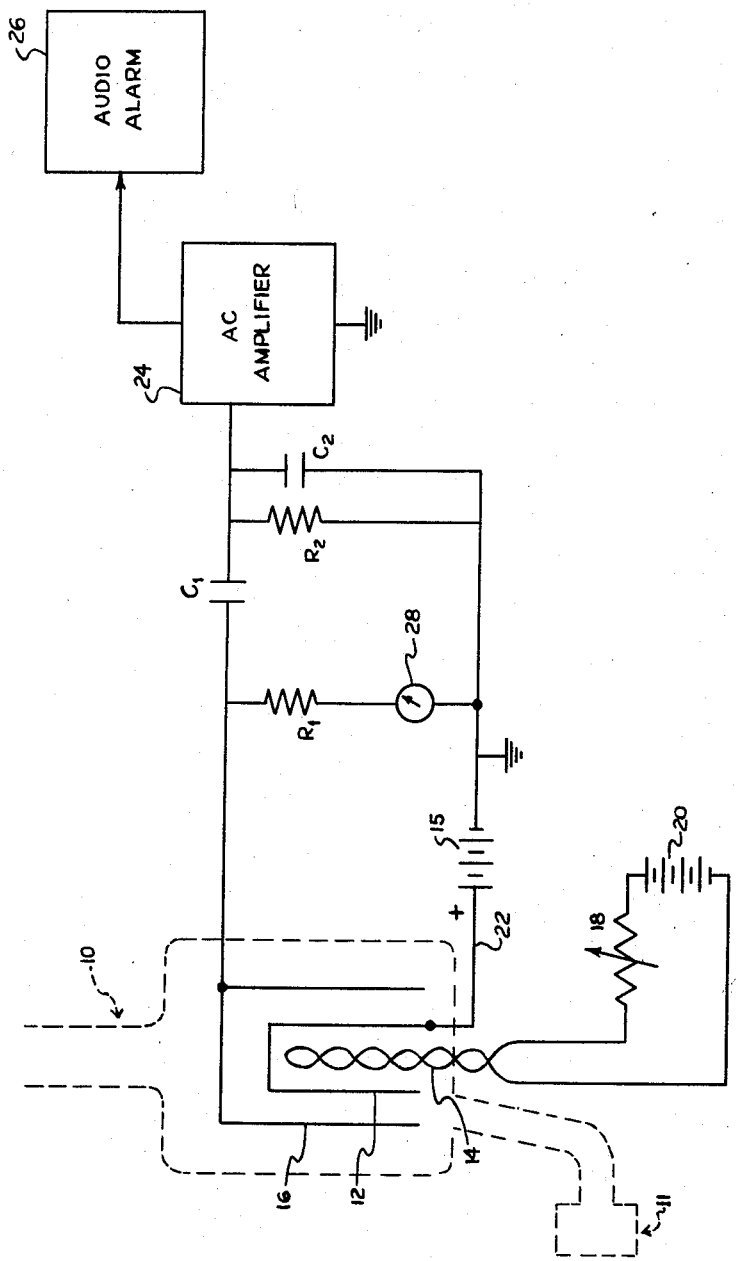

2,934,694

MEASURING

Ralph H. Vacca, Waltham, Mass., assignor to National Research Corporation, Cambridge, Mass., a corporation of Massachusetts Application October 16, 1957, Serial No. 690,590

2 Claims. (Cl. 324—33)

This invention is directed to measuring and more particularly to apparatus for detecting leaks by the use of a halogen-sensitive element. The copending application of Lawrance and Roehrig, Serial No. 551,258, owned by the assignee of this application, described a leak detection system particularly applicable for the detection of small leaks in vacuum systems. This Lawrance and Roehrig leak detector utilizes the basic principle described in Rice Patent 2,550,498. Such leak detectors operate on the principle of creation of ions at a hot platinum surface in the presence of a halogen-containing gas such as Freon or the like.

It is a principal object of the present invention to provide an improved halogen-sensitive leak detector of the above mentioned type having simplified construction and ease of operation.

Another object of the invention is to provide a leak detector of the above type which is relatively inexpensive to build and maintain.

Still another object of the invention is to provide a leak detector of the above type having extreme sensitivity for detecting very small leaks in systems under a high vacuum.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

The present invention is particularly directed to improvements in such gauges which permit the use of an alternating current amplifier for amplifying changes in the ion current generated by the probing of a halogen-containing gas, this system having extremely high sensitivity and ease of operation.

The use of an alternating current amplifier poses certain problems but makes for a simpler more stable amplification system. However, the ion current signal developed in the sensing element is essentially a direct current having superimposed thereon a small current which changes whenever the sensing element probes a halogen-containing gas. To separate this changing current from the base ion current, there is provided an RC network for coupling the sensing tube to the alternating current amplifier. It is necessary that the amplifier differentiate the halogen-responsive signal from slow changes in the base ion current due to temperature variations or pressure variations in the system. It is also necessary to differentiate between the desired halogen-responsive signal and signals resulting from extraneous "noise."

Accordingly, the RC coupling network is a band pass filter, designed to pass frequencies in the range between approximately .01 and 2 c.p.s. With this arrangement fairly rapid signals resulting from the probing of a leak by the sensing element will show up as a signal and can be passed by the coupling network to the alternating current amplifier. However, very slow drifts of the base ion current will not be passed by the coupling network and will not be amplified by the alternating current amplifier. Similarly, very fast signals due to "noise" will not be passed to the amplifier by the coupling network.

Another feature of the present invention permits monitoring of the ion current so as to permit adjustment of the steady state ion current to a predetermined value particularly suited for detecting the halogen-containing gas. This ion current in the halogen-sensitive element is preferably adjusted to a value on the order of 15 to 40 micro amps. When the steady state ion current is considerably less than this value, the sensing element is not operating with optimum sensitivity. When the steady state ion current is much higher than this preferred range the sensing element, while extremely sensitive, is very unstable and subject to wide changes in ion current due to extraneous influences such as pressure variation and excessive mechanical vibrations and the like. The resulting signals are often extremely difficult to differentiate from leaks since their frequency range may be the same order of magnitude as the signal resulting from the probe of a leak. Adjustment of the steady state ion current is preferably achieved by providing a meter in the input to the coupling network to measure the steady state ion current directly. This ion current is then adjusted by controlling the amount of current fed to the heater for the platinum element until the desired 15 to 40 micro amps steady state ion current is obtained.

Referring now to the drawing, there is shown one schematic, diagrammatic view of a preferred embodiment of the invention in which 10 represents a halogen-sensitive tube of the type generally shown in the Rice Patent 2,550,498 and the above mentioned Lawrance and Roehrig application. This tube is preferably maintained under a vacuum on the order of 100 microns Hg abs by means of an evacuating system shown in dotted lines at 11. The sensing element includes a platinum surface 12 which, in one embodiment, is indirectly heated by means of a filament 14. A collector plate 16 surrounds the platinum element 12. The plate 16 is preferably maintained negative with respect to the platinum element 12 by means of a battery 15.

The temperature of the filament 14 is preferably controlled by a rheostat 18 which is in series with a constant voltage source 20 and the filament 14. The positive ion current collected by the plate 16 flows into resistor $R_1$ to develop a voltage which can be fed through an RC network comprising resistance $R_2$ and capacitors $C_1$ and $C_2$.

In one preferred embodiment of the invention the RC network comprising capacitors $C_1$ and $C_2$ and resistor $R_2$ will pass frequencies between approximately .01 and 2 c.p.s., $R_2$ having a value of 1 megohm capacitor $C_1$ having a value of 15 microfarads and capacitor $C_2$ having a value of 0.1 microfarad. The signal passed by the RC network is amplified by the alternating current amplifier 24 which preferably controls the operation of an audio alarm 26. In a preferred embodiment of the invention a microammeter 28 is put in series with the input resistance $R_1$ for measuring the steady state ion current when no halogen responsive signal is being fed to the system. Accordingly, at any time it is desired to adjust the steady state ion current to the predetermined value (e.g., 15 to 40 micro amps.); this may be conveniently achieved by examining the meter 28 and changing the value of the rheostat 18 until the desired current is obtained at meter 28.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. A halogen-sensitive leak detector of the type wherein a positive ion current is obtained in response to the probing of a halogen-containing gas such as Freon by a halogen-sensitive tube containing a hot platinum element, said leak detector comprising the combination of said halogen sensitive tube, a source of direct current voltage for collecting ion current in said tube, an alternating current amplifier for amplifying changes in the ion current generated by the probing of a halogen containing gas, and an RC network for coupling the sensing tube to the amplifier, the input of the RC network being connected to the output of the halogen sensitive tube and the output of the RC network being connected to the input of the amplifier the RC network being designed to pass frequencies in the range of approx. 0.01 to 2 c.p.s.

2. A halogen-sensitive leak detector of the type wherein a positive ion current is obtained in response to the probing of a halogen-containing gas such as Freon by a halogen-sensitive tube containing a hot platinum element, said leak detector comprising the combination of said halogen sensitive tube, a source of direct current voltage for collecting ion current in said tube, an alternating current amplifier for amplifying changes in the ion current generated by the probing of a halogen-containing gas, and an RC network for coupling the sensing tube to the amplifier, the input of the RC network being connected to the output of the halogen sensitive tube and the output of the RC network being connected to the input of the amplifier the RC network being designed to pass frequencies in the range of approx. .01 to 2 c.p.s., a meter for reading steady state ion current flowing in the halogen sensitive tube in the absence of a halogen gas, and means for adjusting the temperature of the platinum element to obtain a predetermined steady state ion current.

References Cited in the file of this patent

UNITED STATES PATENTS

| | | |
|---|---|---|
| 2,550,498 | Rice | Apr. 24, 1951 |
| 2,560,952 | Herold | July 17, 1951 |